(12) United States Patent
Sheller et al.

(10) Patent No.: US 9,659,158 B2
(45) Date of Patent: May 23, 2017

(54) TECHNOLOGIES FOR DETERMINING CONFIDENCE OF USER AUTHENTICATION

(71) Applicant: Intel Corporation, Santa Clara, CA (US)

(72) Inventors: Micah J. Sheller, Hillsboro, OR (US); Ned M. Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 14/583,662

(22) Filed: Dec. 27, 2014

(65) Prior Publication Data

US 2015/0363582 A1    Dec. 17, 2015

Related U.S. Application Data

(60) Provisional application No. 62/012,408, filed on Jun. 15, 2014.

(51) Int. Cl.
*H04L 29/06* (2006.01)
*G06F 21/31* (2013.01)

(52) U.S. Cl.
CPC .................... *G06F 21/31* (2013.01)

(58) Field of Classification Search
CPC ............................. H04L 63/105; G06F 21/62
See application file for complete search history.

(56) References Cited

U.S. PATENT DOCUMENTS

| | | | | |
|---|---|---|---|---|
| 2006/0288234 A1* | 12/2006 | Azar | ................... | G06F 21/32 713/186 |
| 2007/0241861 A1* | 10/2007 | Venkatanna | ............ | G06F 21/32 340/5.52 |
| 2008/0016313 A1* | 1/2008 | Murotake | ........... | G06F 12/1416 711/173 |
| 2014/0007227 A1* | 1/2014 | Morinaga | ............... | G06F 21/31 726/19 |
| 2014/0046954 A1* | 2/2014 | MacLean | ............ | G06F 17/2241 707/748 |
| 2014/0208417 A1* | 7/2014 | Robison | .................. | G06F 21/32 726/19 |

* cited by examiner

*Primary Examiner* — Jason K Gee
(74) *Attorney, Agent, or Firm* — Barnes & Thornburg LLP

(57) ABSTRACT

Technologies for determining a confidence of user authentication include authenticating a user of a computing device based on a set of authentication factors and a fusion function that fuses the set of authentication factors to generate an authentication result. A false accept rate and a false reject rate of the authentication result is determined, and an authentication confidence for the authentication result is determined. The authentication of the user is performed passively, without interruption or interruption of the user. If the authentication confidence is below a threshold value, an active authentication procedure may be performed.

22 Claims, 5 Drawing Sheets

600 FUSED AUTHENTICATION TEMPLATE TABLE FOR USER n

| f() | MOTION CLASSIFIER 1 | VICINITY CLASSIFIER 1 | LOCATION CLASSIFIER 1 |
|---|---|---|---|
| T | T | T | T |
| T | T | T | F |
| T | T | F | T |
| F | T | F | F |
| T | F | T | T |
| F | F | T | F |
| F | F | F | T |
| F | F | F | F |

FIG. 6

700 USED AUTHENTICATION TEMPLATE TABLE FOR USER n

| f() | MOTION CLASSIFIER 1 | MOTION CLASSIFIER 2 | LOCATION CLASSIFIER 1 | VICINITY CLASSIFIER 1 |
|---|---|---|---|---|
| T | T | T | T | T |
| T | T | T | T | F |
| T | T | T | F | T |
| U | T | T | F | F |
| T | T | F | T | T |
| U | T | F | T | F |
| U | T | F | F | T |
| F | T | F | F | F |
| T | F | T | T | T |
| U | F | T | T | F |
| U | F | T | F | T |
| F | F | T | F | F |
| U | F | F | T | T |
| F | F | F | T | F |
| F | F | F | F | T |
| F | F | F | F | F |

FIG. 7

TECHNOLOGIES FOR DETERMINING CONFIDENCE OF USER AUTHENTICATION

CROSS-REFERENCE TO RELATED APPLICATION

The present application claims priority under 35 U.S.C. §119(e) to U.S. Provisional Patent Application Ser. No. 62/012,408, entitled "TECHNOLOGIES FOR DETERMINING CONFIDENCE OF USER AUTHENTICATION," which was filed on Jun. 15, 2014.

BACKGROUND

Computing devices, such as smart phones and tablet computers, are quickly becoming ubiquitous tools used on a daily basis by many people. On many computing devices, especially mobile devices that have a higher risk of being misplaced or lost, security is a significant concern. As such, a typical computing device often utilizes some form of user authentication to verify the identity of the user and, thereby, control access to the computing device or specific, sensitive data and/or functionality. Oftentimes, user authentication is implemented as an active authentication procedure in which the user authentication requires some action by the user or otherwise interrupts the users interaction with the device to complete authentication. For example, many computing devices utilize some form of a password or personal identification number (PIN) authentication in which the user is required to enter the password or PIN. As most computing devices have some form of a physical or virtual keyboard, it is only natural that passwords would become the primary form of authentication for most applications, systems, and services. Of course, the advent of PDAs, smartphones, and tablets meant people no longer could be tethered to their physical keyboards. Touch-screen displays turned the screen into an input device, and virtual keyboards made it possible for users to continue using their passwords. However, the clunky hunt-and-peck user experience of typed passwords on a touch screen gave way to innovative variations on passwords. "Swipe authentication," a variation on a PIN, allowed user to remember only a general geometric shape and play "connect the dots," which many find easier to remember and input than a passcode or password. As such, innovation in touch screens has enabled innovation in authentication technique.

Many computing devices also include one or more sensors, which may be configured to sense various environmental or user conditions or criteria. Some user authentication systems utilize the sensors of the computing device. For example, some authentication systems rely on biometric sensors, such as a fingerprint scanner or retina scanner, to authenticate the user. However, the use of the biometric and/or other sensors of the computing device is typically implemented as an active authentication procedures, which requires the user to actively respond to the authentication similar to traditional passwords.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a simplified diagram of at least one additional embodiment of a fused data template that may be generated using the method of FIG. 3; and FIG. 7 is a simplified flow diagram of at least one embodiment of a method for determining a confidence of user authentication.

DETAILED DESCRIPTION OF THE DRAWINGS

Figure 1:
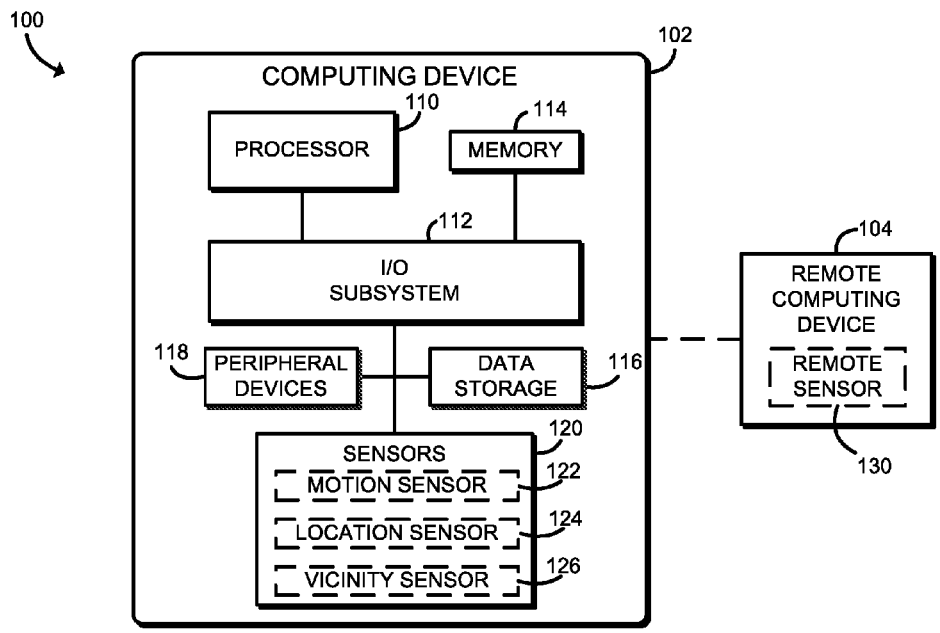
FIG. 1 is a simplified block diagram of at least one embodiment of a system for determining confidence of user authentication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for determining confidence of a user authentication includes a computing device 102. Additionally, in some embodiments, the system 100 may further include one or more remote computing devices 104, which may communicate with the computing device 102 in some manner (e.g., over a communication link or network). In use, the computing device 102 is configured to continuously or continually determine a level of authentication confidence of an authentication of a user of the computing device 102. The authentication may be a current authentication or may have been performed at some time in the past (e.g., an initial authentication to the computing device 102). As discussed in more detail below, the determined authentication confidence may be embodied as a confidence value or score indicative of the probability that a given user is currently at the computing device 102 (e.g., operating the computing device 102). The authentication confidence is determined based on a False Accept Rate (FAR) and a False Reject Rate (FRR) of authentication factors (e.g., classification data based on sensor data input). Unlike some biometric authentication systems, however, the FAR and FRR used to determine the authentication confidence may be determined based on a collection multiple passive authentication factors such as, for example, motion data, location data, proximity data, or other sensor data. Additionally, as discussed in more detail below, the authentication confidence is determined continuously, continually, or periodically, which allows the authentication system of the computing device 102 to passively (i.e., without active participation by the user) and continually authenticate the user.

If the authentication confidence falls below a threshold level, the computing device 102 may prompt the user for active authentication (e.g., entry of a password or PIN). In this way, the level or degree of authentication confidence is maintained throughout the user session, unlike traditional active authentication procedures in which the authentication confidence drastically decreases with time. Additionally, the collection of sensor data and associated classification data used to authenticate the user may be selected based on an authentication confidence associated with the particular collection of sensors. For example, as discussed in more detail below, the computing device 102 may generate a fused authentication template, which aggregates multiple authentication factors to determine whether the user is authenticated based on the biometric data. The particular fused authentication template (i.e., the particular collection authentication classifiers and/or sensors to be used) may be selected based on an authentication confidence associated with each fused authentication template such that the template having the greatest level of confidence may be used to authenticate the user.

The computing device 102 may be embodied as any type of computing device capable of authenticating a user and performing the functions described herein. For example, the computing device 102 may be embodied as a smartphone, a cellular phone, a table computer, a notebook computer, a laptop computer, a smart appliance, a desktop computer, a consumer electronic device, a server, a server controller, a router, a switch, a distributed computing system, a multi-processor system, and/or any other computing device capable of authenticating a user as described herein. As shown in FIG. 1, the illustrative computing device 102 includes a processor 110, an I/O subsystem 112, memory 114, a data storage 116, one or more peripheral devices 118, and one or more sensors 120. Of course, the computing device 102 may include other or additional components, such as those commonly found in a computer (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The peripheral devices 118 may include any type of peripheral device commonly found in a typical computing device, such as various input/output devices. For example, the peripheral devices 118 may include communication circuitry, display circuitry, various input buttons and switches, a keyboard, a mouse, speaker, microphone, and/or other peripheral devices.

The sensors 120 may be embodied as one or more sensors of any type capable of generating sensor data useful in passively authenticating a user of the computing device 102 as discussed in more detail below. For example, in the illustrative embodiment, the sensors 120 are embodied as passive biometric and/or passive context sensors capable of generating data indicative of biometric characteristics, a context of the user or the computing device 102, and/or characteristics of the environment of the computing device 102. For example, the sensors 120 may include one or more motion sensors 122, one or more location sensors 124, one or more proximity sensors 126, and/or one or more other sensors capable of generating data useful in passively authenticating the user.

The motion sensors 122 may be embodied as any type of sensor(s) capable of generating data indicative of a motion of the computing device 102 including, but not limited to, gyroscope sensor, an accelerometer, an inertial motion unit, a combination of motion sensors, and/or other motion sensors. In use, the motions sensors 122 may be configured to generate sensor data indicative of how the user interacts with the computing device 102 while performing certain tasks or function on the device. For example, the generated motion data may provide an indication of whether the user holds the phone more horizontally or more vertically when dialing a number, whether the user tends to hold the phone in landscape or portrait orientation when taking a picture, whether the user tends to set the phone down during a call, and so forth. Of course, any type of passive motion sensor data may be used to determine user authentication in other embodiments.

The location sensors 124 may be embodied as any type of sensor(s) capable of generating data indicative of a location of the computing device 102 including, but not limited to, a global positioning system (GPS) sensor, a triangulation or trilateration sensor, and/or other location sensors. In use, the location sensors 124 may be configured to generate sensor data indicative of the location(s) at which the user utilizes the computing device 102 and/or utilizes specific functions thereof. For example, the generated location sensor data may provide an indication of the typical location of the user when the user makes a call to home or the office, the typical location of the user when the user interacts with a specific application on the computing device 102, the typical location of the user when the user access specific websites or data, and so forth. Again, any type of additional or other passive location sensor data may be used in determine authentication in other embodiments.

The vicinity sensors 126 may be embodied as any type of sensor(s) capable of generating data indicative of the local vicinity in which the computing device 102 is used, as well as spatial relationship between the computing device 102 and other structures, devices, or entities (e.g., the proximity of the computing device 102 relative to other structures, devices, or entities). For example, the vicinity sensors 126 may be embodied as, or otherwise include, camera sensors, audio sensors, short-ranged communication circuits or sensors (e.g., Near Field Communication circuits, Bluetooth communication circuits, etc.), and/or other vicinity or proximity sensors. In use, the vicinity sensors 126 may be configured to generate sensor data indicative of the local vicinity or spatial proximity of the computing device 102 while the user utilizes the computing device 102 and/or utilizes specific functions thereof. For example, the generated vicinity sensor data may provide an indication of the typical local environment (e.g., office space, vehicle, outdoor area, etc.) in which the user utilizes a particular application or function of the computing device 102. To do so, the computing device 102 may analyze image data from a camera sensor, for example, to identify background structures from which the local environment can be identified. Additionally, the generated vicinity sensor data may be embodied as data indicative of the typical proximity of another structure or computing device when the user utilizes a particular application or function. For example, the vicinity sensors 126 may include one or more user proximity sensors capable of detecting whether the user has the computing device 102 near her ear, in her pocket, laying on a table, and/or the like when interacting with the computing device 102 in a certain manner. Additionally or alternatively, the vicinity sensors 126 may include communication circuits, as discussed above, to communicate with the remote computing device 104 to determine whether the computing device 104 is within a predefine distance or range of the computing device 102.

Of course, the sensors 120 may include additional or alternative sensors in other embodiments. Additionally, in some embodiments, the sensors 120 may include sensors remote or separate from the computing device 102. For example, in some embodiments the computing device 102 may be configured to receive sensor data from a remote sensor (e.g., the remote sensor 130 of the remote computing device 104) and determine user authentication and/or authentication confidence based on such sensor data.

It should be appreciated that the sensor data generated by the sensors 120 may be utilized to determine an authentication signature of the user (e.g., the motion used by the user during particular activities, locations visited by the user during particular activities, and so forth). It should be further appreciated that any single piece of sensor data may be used to authenticate the user, similar to a single traditional active authentication process (e.g., the entering of a password). However, to improve the level of confidence of authentication, multiple sensor data (e.g., from multiple sensors) are used by the computing device 102 to passively authentication the user on a continuous, continual, and/or periodic basis. For example, motion data indicative of the current orientation of the computing device 102, location data indicative of the current location of the computing device 102, and/or vicinity data indicative of the proximity of another computing device while the user is interacting with the computing device 102 may be used in combination to passively authenticate the user as discussed in more detail below.

Similar to the computing device 102, the remote computing device 104 may be embodied as any type of computing device capable of performing the functions described herein. For example, the computing device 104 may be embodied as a smartphone, a cellular phone, a table computer, a notebook computer, a laptop computer, a smart appliance, a desktop computer, a consumer electronic device, a server, a server controller, a router, a switch, a distributed computing system, a multiprocessor system, and/or any other computing device capable of authenticating a user as described herein. The remote computing device 104 may include components similar to the components of the computing device 102 described above, the description of which is not repeated herein for clarity of the description. In some embodiments, the remote computing device 104 may include one or more remote sensors 130. The remote sensor(s) 130 may be embodied as any type of sensor similar to the sensors 120. As discussed above, in some embodiments, the computing device 102 may be configured to receive the sensor data generated by the remote sensor(s) 130 and determine user authentication and/or authentication confidence based thereon.

Figure 2:
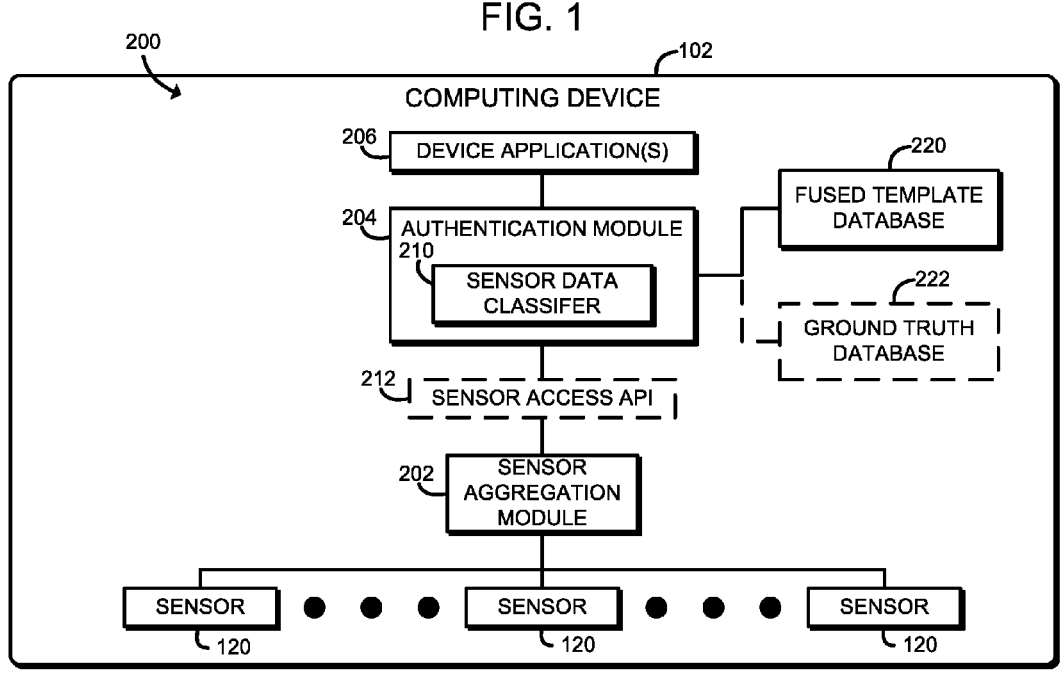
FIG. 2 is a simplified block diagram of at least one embodiment of an environment of a computing device of FIG. 1.

Referring now to FIG. 2, in use, the computing device 102 may establish an environment 200. The illustrative environment 200 includes a sensor aggregation module 202 and an authentication module 204. Additionally, in some embodiments, the environment 200 may include one more device applications (e.g., software applications), which may interface with the authentication module 204 to authenticate the user. Additionally, in some embodiments, the environment 200 may include a sensor access application program interface (API) 212, which provides an interface between the authentication module 204 and the sensor aggregation module 202. For example, the sensor access API 212 may be embodied in or part of the system software of the computing device 102. The environment 200 may also include a fused template database 220 and/or a ground truth database 222. Each of the modules and other components of the environment 200 may be embodied as firmware, software, hardware, or a combination thereof. For example the various modules, logic, and other components of the environment 200 may form a portion of, or otherwise be established by, the processor 110, the I/O subsystem 112, an SoC, or other hardware components of the computing device 102. As such, in some embodiments, any one or more of the modules of the environment 200 may be embodied as a circuit or collection of electrical devices (e.g., a authentication circuit, a sensor aggregation circuit, etc.).

The sensor aggregation module 202 is configured to receive sensor data from each of the sensors 120 (and, in some embodiments, the sensor 130). As discussed below, the sensor aggregation module 202 may be configured to continuously, continually, and/or periodically sample or otherwise retrieve the sensor data from the sensors 120. Additionally, in some embodiments, the sensor aggregation module 202 may perform data manipulation and/or analysis on the sensor data. For example, in some embodiments, the sensor aggregation module 202 may include a sensor data classifier 210 (discussed below) to aggregate the sensor data, or a subset thereof, and generate classifier output data based thereon.

The authentication module 204 is configured to authenticate the user of the computing device 102 based on the sample sensor data received from the sensor aggregation module 202 and one or more fused authentication templates stored in the fused template database 220. As discussed in more detail below, the particular fused authentication template used to continuously, continually, and/or periodically authenticate the user may be based on a determined authentication confidence associated with each fused authentication template. It should be appreciated that such authentication may occur "in the background" with no active knowledge by the user. Additionally, should the authentication confidence drop below a reference threshold, the authentication module 204 may be configured to actively authenticate the user by, for example, presenting the user with a password/PIN challenge.

Figure 3:
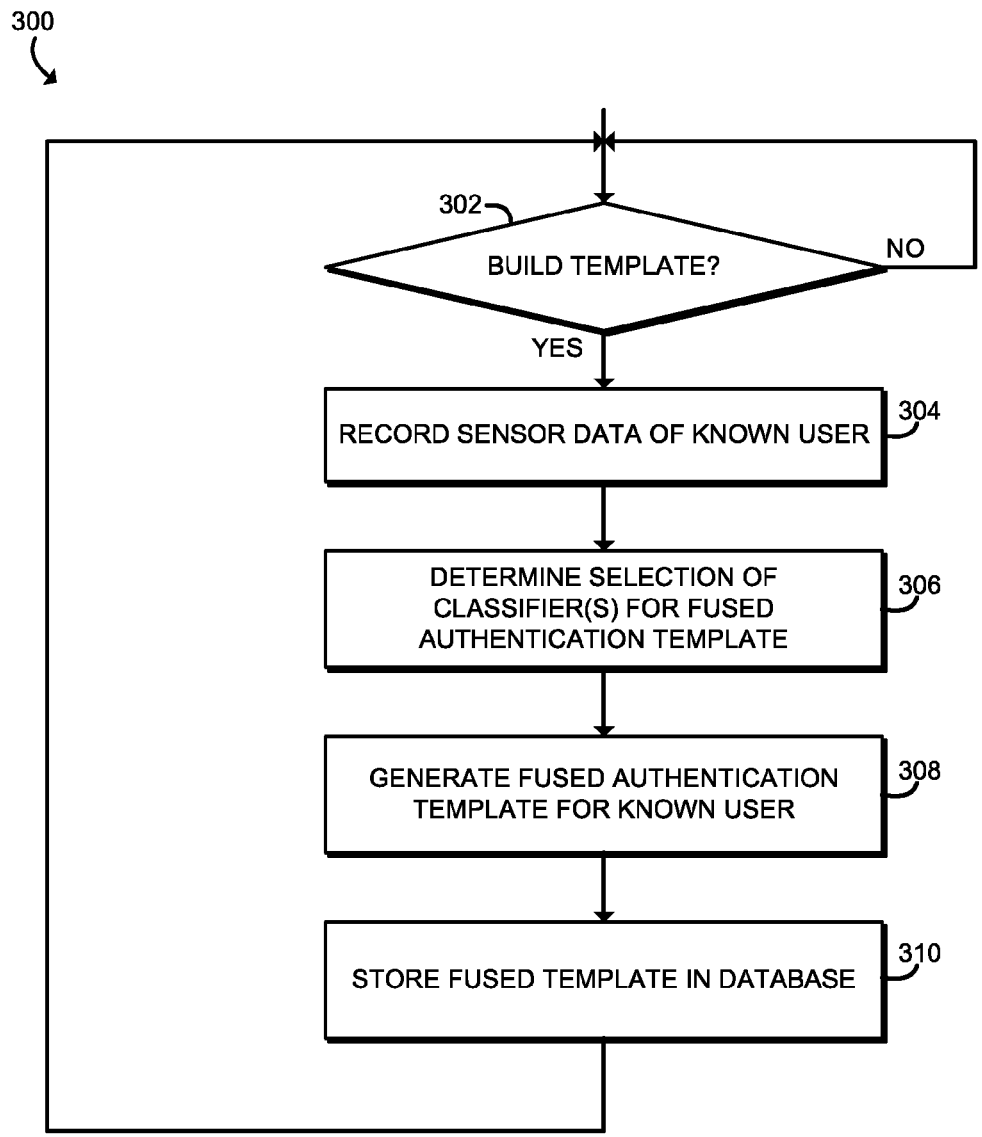
FIG. 3 is a simplified flow diagram of at least one embodiment of a method for generating a fused authentication template that may be executed by the computing device of FIGS. 1 and 2.

As discussed above, the fused template database 220 stores one or more fused authentication templates, which have been previously generated based on a user sample set (see FIG. 3). The ground truth database stores a set of default or initial assumptions or variables. The ground truth establishes the value or nature of expected sensor readings, in reality conditions, for a given user behavior or biometric. Ground truth can validate the disclosed methodology by comparing computed authentication confidence values to the ground truth data set. Ground-truth collection may require a statistically significant population of individuals who participate in data collection by annotating sensor data with characteristic behaviors. Characteristic behavior data helps during data analysis to recognize patterns indicative of the expected behavior. Pattern data assist in creation of behavior classifiers that are used to train the passive authentication factor algorithms.

Referring now to FIG. 3, in use, the computing device 102 may execute a method 300 for generating a fused authentication template. Each fused authentication template may be embodied as a collection of authentication factors (i.e., sensor data classifiers and/or raw sensor data). Unlike a typical biometric template that attempts to match a single sensor sample to a known authentication sample (e.g., a facial recognition template), each fused authentication template utilizes multiple single-factor templates (e.g., multiple classifiers). The fused authentication template used to perform a single instance of authentication may then be selected based on the available sensor data, classifier output, or other criteria. As discussed below, each fused authentication template has a corresponding fusion function that generates an authentication result based on the matching function of each individual authentication factor.

The method 300 begins with block 302 in which the computing device 102 determines whether to build a new fused authentication template. If so, the method 300 advances to block 304 in which sensor data generated by the sensors 120 is recorded for a known user. In some embodiments, the user may be instructed to perform a certain action or set of actions. However, in other embodiments, the user may behave normally, without knowledge of the generation of the fused authentication template. The recoded sensor data may be used to train the individual classifiers as discussed below.

In block 306, one or more classifiers is selected as individual authentication factors for generating the fused authentication template. The computing device 102 may include any number of classifiers, which may be selected individually or as a group to generate a particular fused authentication template. Illustratively, each classifier may be embodied as a set of classification rules generated via a machine learning classification algorithm (e.g., a support vector machine algorithm, logistic regression algorithm, etc.) and an associated training set of data. Each classifier may generate binary or n-ary data classification output indicative of a particular context, condition, or action. For example, a classifier may generate a "true" or "false" output indicative of whether the computing device 102 is in a pocket of the user, in a container, or other enclosure. To do so, such classifier may receive sensor data from, for example, a light sensor and sensor data from a proximity sensor and determine the classification condition based on such data.

Figure 4:
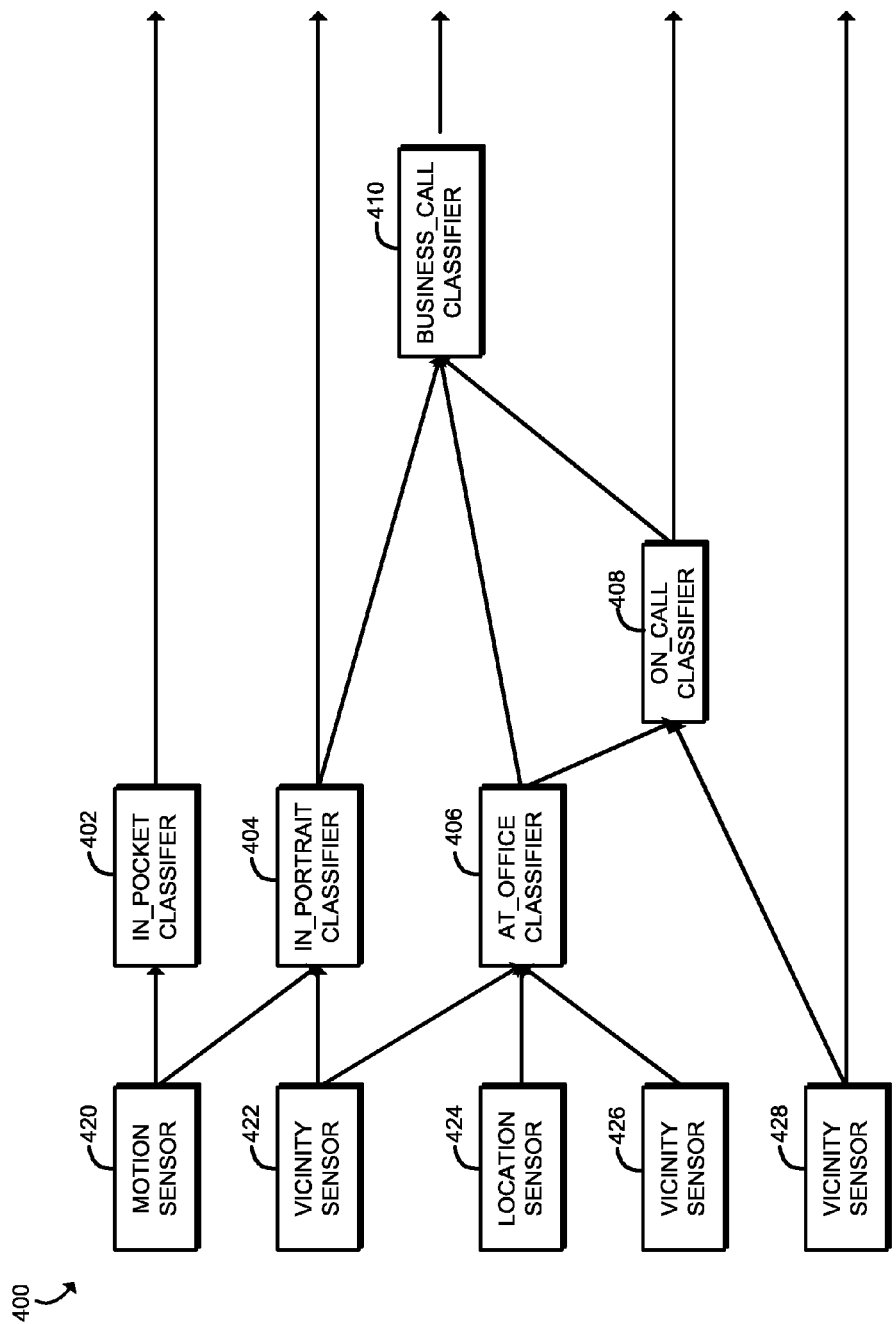
FIG. 4 is a simplified diagram of at least one embodiment of a fused data template that may be generated using the method of FIG. 3.

Each classifier may utilize any passive sensor data, as well as output of another classifier, as an input to generate an authentication classification (e.g., "authenticated" or "not authenticated"). For example, an illustrative classifier system 400 is shown in FIG. 4. In illustrative classifier system 400 includes an IN_POCKET classifier 402, an IN_PORTRAIT classifier 404, an AT_OFFICE classifier 406, an ON_CALL classifier 408, and a BUSINESS_CALL classifier 410. The illustrative IN_POCKET classifier 402 accepts sensor data from a motion sensor 420 (e.g., a gyroscope sensor) and classifies the received sensor data as an indication of whether the computing device 102 is in a pocket of the user or not. The illustrative IN_PORTRAIT classifier 404 accepts sensor data from the motion sensor 420 and a vicinity sensor 422 (e.g., a camera or proximity sensor) and classifies the received sensor data as an indication of whether the computing device 102 is positioned in a portrait orientation or not. The illustrative AT_OFFICE classifier 406 accepts sensor data from the vicinity sensor 422, a location sensor 424 (e.g., a global positioning system circuit), and a vicinity sensor 426 (e.g., a camera or proximity sensor) and classifies the received sensor data as an indication of whether the computing device 102 is located at a particular office. The ON_CALL classifier 408 accepts the classification output of the AT_OFFICE classifier 406 and the sensor data from the vicinity sensor 428 (e.g., a proximity sensor) and classifies the receives data as an indication of whether the user is actively on a call with the computing device 102. More specifically, the BUSINESS_CALL classifier 410 accepts the classification output of the IN_PORTRAIT classifier 404, the AT_OFFICE classifier 406, and the ON_CALL classifier 408 and classifies the received data as an indication of whether the user is on a business call. Of course in other embodiments, additional or other types of classifiers may be used based on the particular implementation. Additionally, as discussed below, some fused authentication templates may utilize the sensor data itself as an input, without any classification thereon.

Referring back to FIG. 3, in block 308, a fused authentication template is generated for the known user based on the selected sensors and/or classifiers. As discussed above, each fused authentication template has an associated fusion function that "fuses" the multiple sensor and/or classifier data output to generate a corresponding an n-tary output (e.g., a "true" or "false" output). Any number and type of fused authentication templates may be generated for use by the computing device 102 to authenticate the user. For example, a fused authentication template may describe the typical motion of the computing device 102 when handled by the user, the typical location of the user when performing a certain function (e.g., calling or searching the Web), or other context characteristic of the user or computing device 102. In block 310, the fused authentication template(s) is stored in the fused template database 220.

Figure 5:
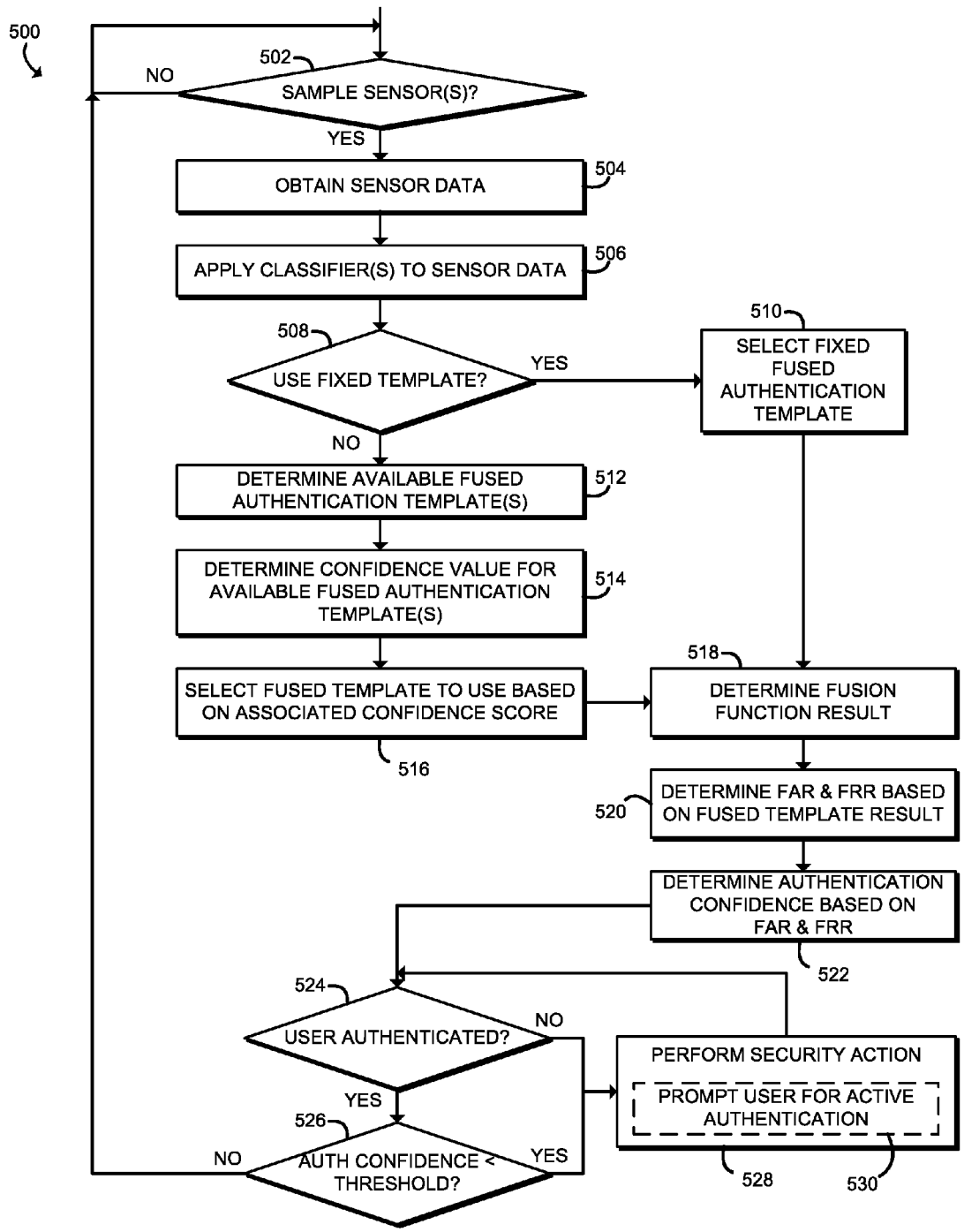
FIG. 5 is a simplified diagram of at least one embodiment of a classifier system that may be used during execution of the method of FIG. 3.

Referring now to FIG. 5, in use, the computing device 102 may execute a method 500 to passively authenticate a user. The method 500 begins with block 502 in which the computing device 102 determines whether to sample the sensors 120. In some embodiments, for example, the sensors 120 may be periodically sampled at a reference sample rate. The sampling of the sensors 120 may be performed in the "background" such that the user of the computing device 102 is not aware or overly interrupted during the execution of the method 500.

If the sensors 120 are to be sampled, the method 500 advances to block 504 in which the sensor data generated by the sensors 120 (and/or sensors 130) is obtained. In block 506, one or more classifiers (i.e. classification rules) may be applied to the one or more sensor data depending on the particular classifier(s) used. As discussed above, the sensor data classifier 210 may be embodied in the authentication module 204, the sensor aggregation module 202, or in the sensors 120 themselves. Additionally, as discussed above, any number of sensor data classifiers may be used.

In block 506, the computing device 102 determines whether to use a fixed or predetermined fused authentication template (i.e., the collection of sensors and/or classifiers may be fixed or variable) to perform the user authentication. That is, in some embodiments, a single or reference fused authentication template may be used to perform user authentication (e.g., a fused authentication template that utilizes every sensor available on the computing device 102 to perform passive authentication). If so, the method 500 advances to block 510 in which the fixed or predetermined fused authentication template is retrieved or selected from the fused template database 220. It should be appreciated that the fused authentication template may be embodied as a simple identification of which classifiers and/or sensor to use to perform the present authentication. If a fixed fused authentication template is not to be used, the method 500 advances to block 512 in which the available fused authentication templates are determined. The available templates may be determined based on those templates stored in the fused template database 220, based on the available sensor data (e.g., not all sensors may be active or producing usable sensor data at all times), and/or other criteria. In block 514, an authentication confidence associated with each available fused authentication template is determined, identified, or retrieved. As discussed below, the authentication confidence of each fused authentication template is based on a False Accept Rate (FAR) and False Reject Rate (FRR) of the set of authentication factors (e.g., classifiers or sensors) that embodies the particular fused authentication template. Subsequently, in block 516, a fused authentication template is selected from the available fused authentication templates based on the associated confidence scores (e.g., the fused authentication template having the best authentication confidence given the available sensor data may be selected).

After the fused authentication template has been selected in block 510 or block 516, the method 500 advances to block 518. In block 518, the result of the fusion function associated with or defined by the selected fused authentication template is determined. To do so, the output or result of each authentication factor (e.g., each classifer) is determined and such results are "fused" to arrive at a final fused result for user authentication based on the multiple authentication factors. As discussed above, such authentication may occur passively, without knowledge and/or interruption of the user. Additionally, such authentication may occur periodically (e.g., based on the sensor sample rate of block 502), continually, or continuously. In the illustrative embodiment, the authentication module 204 of the computing device 102 is configured to authenticate a user using multiple authentication factors (e.g., multiple classifiers and/or sensor data).

It should be appreciated that the illustrative computing device 102 authenticates a user based on multiple authentication factors (e.g., multiple classifiers). In a typical signal factor authentication system (S), user authentication relies on a matching function m( ) that compares the current sensor sample (e.g., image data) to a template of values known to describe the user (e.g., a known user image) such that:

$$S=m(T,x); \text{ wherein } x \text{ is a sample and } T \text{ is the template} \quad (1)$$

Conversely, the authentication module 204 of the computing device 102 processes multiple authentication factors to authenticate the user. As such, the computing device 102 utilizes a fusing function $f( )$, associated with the selected fused authentication template, that maps each individual matching function associated with each individual authentication factor to the overall assertion of S:

$$S=f(m1(T1,x1),m2(T2,x2), \ldots mn(Tn,xn)),x);$$

In many implementations, the outputs of the matching functions m1 . . . n( ) are n-ary, and if not, may be intended to be treated as binary according to some threshold chosen to match the use case. It should be noted that matching functions that output scalars are not outputting raw probabilities.

Given matching functions that provide n-ary outputs, the fusion function then takes n-ary inputs, which means that a given fusion function $f( )$ can be expressed as a truth table. For example, as shown in FIG. 4, a fusion function $f( )$ may be represented by a truth table 600 having three authentication factors (i.e., motion classifier 1, vicinity classifier 1, and location classifier 1) and generating a binary output (i.e., "T" for true or "F" for false) as an indication of whether the user is authenticated. The fusion function illustrated in FIG. 6 implements a basic majority vote system, but more complex functions including various weighting parameters, may be used in other embodiments. For example, in other embodiments, other fusion functions having greater or fewer inputs, n-ary outputs, and/or temporal inputs may be used. For example, another embodiment of a fusion function $f(\ )$ may be represented by a truth table 700 as shown in FIG. 7. The fusion function of FIG. 7 has four classifier/sensor inputs (i.e., motion classifier 1, motion classifier 2, location classifier 1, and vicinity classifier 1) and a trinary output (i.e., "T" for true, "F" false, or "U" for undetermined). As discussed above, each classifier may be generated based on one or more sensor outputs and/or other classifier outputs.

Referring back to FIG. 5, after the user has been initially authenticated by comparing the sensor samples to the fused authentication template in block 518, the False Accept Rate (FAR) and the False Reject Rate (FRR) for the authentication result of the multi-factor fusion function used in block 518 in determined in block 520. The FAR computes the probability that the system identifies the user given it actually isn't the user:

FAR=$P$(System=User|Reality=!User)

The FRR computes the probability that the system doesn't identify the user given it actually is the user:

FRR=$P$(System=!User|Reality=User)

For single-factor authentication, calculating FAR and FRR involves a pair of relatively straightforward experiments: present the system with a representative sample of users and record the responses. The samples and results form the data set D of ordered pars (u,x), where u is the user sampled and x is the sensor sample. The sample may then be run against the template for each user, categorizing each run as one of the following sets:

$fp$=false positives=$\{T,u,x)|T \neq T_u, m(T,x)$=true$\}$ $tp$=true positives=$\{T,u,x)|T=T_u, m(T,x)$=true$\}$ $fn$=false negatives=$\{T,u,x)|T=T_u, m(T,x)$=false$\}$ $tp$=true negatives=$\{T,u,x)|T \neq T_u, m(T,x)$=false$\}$ From such categorization, the FAR and FRR may be determined for the single-factor authentication as:

FAR=$|fp|/(|fp|+|tn|)$

FRR=$|fn|/(|fn|+|tp|)$

Although the authentication module 204 of the computing device 102 utilizes a multi-factor authentication, the FAR and FRR for the multi-factor authentication (i.e., the result of the fusion functions) can be determined in the same way as above, except that the fusion function, $f(\ )$, is substituted for the individual matching function, $m(\ )$. It should be appreciated that while each fused authentication template may have an associated base FAR and FRR (and confidence value based thereon as discussed below), the FAR and FRR of the fused authentication template results may vary from the base FAR and FRR value over time based on historical results (e.g., if authentication is determined to be "true" over several iterations of the fusion function, the confidence value may increase over time).

After the computing device 102 has determined the FAR and FRR for the fused authentication result of the multi-factor fusion function in block 520, the method 500 advances to block 522. In block 522, the authentication module 204 of the computing device 102 determines the authentication confidence (CNF) of the authentication result based on the determined FAR and FRR for the authentication result. The authentication confidence provides an indication of the probability that a given user is at the computing device 102, given that the system has identified the user:

CNF=$P$(Actual=User|System=User)

To determine the authentication confidence (CNF), the authentication confidence is estimated based on the FAR and FRR values of the result of the fusion function for the present sensor sample. FRR and CNF are related according to Bayes' theorem as follows:

$$CNF = P(R = u | S = u) = P(S = u | R = u) * \frac{P(R = u)}{P(S = u)}$$

$$CNF = (1 - P(S \neq u | R = u)) * \frac{P(R = u)}{P(S = u)}$$

$$CNF = (1 - FRR) * \frac{P(R = u)}{P(S = u)}$$

Wherein R is Reality, R=u is the event that user u is at the System, S is the System, and S=u is the event that the System authenticates the user u. The term $P(S=u)$ may be eliminated by using FAR in the above equation to produce a final authentication confidence equation based on FAR and FRR:

$$CNF = \frac{1 - FRR}{1 - FRR + \frac{FAR}{P(R = u)} - FAR}$$

Of course, a value must be determined for $P(R=u)$, which is the probability that a given user is at the system at the time of an authentication. For a private computing device or system in a secure location, $P(R=u)$ may be set close to 1. However, for a public, shared computing device or system, the value may be set much lower. In some embodiments, the selection of determination of the value of $P(R=u)$ may be validated by experts to ensure a more accurate value.

In some embodiments, the ground truth database 222 may be utilized to validate an estimated or determined value of $P(R=u)$. The ground truth establishes the value or nature of expected sensor readings, in reality conditions, for a given user behavior or biometric across a sample set of individuals. Ground truth can validate the selection of $P(R=u)$ by comparing computed confidence values to the ground truth data set stored in the ground truth database. Extant differentials may indicate that the estimated or computed value of $P(R=u)$ may need adjusted. The use of the ground truth data may be implemented during training, initialization, or at each authentication confidence determination.

Ground-truth collection may use a statistically significant population of individuals who participate in data collection by annotating sensor data with characteristic behaviors. Characteristic behavior data helps during data analysis to recognize patterns indicative of the expected behavior. Pattern data assist in creation of behavior classifiers that may be used used to train the passive authentication factor algorithms. Additionally, user-settable controls to further finetune and personalize tolerances.

Referring back to FIG. 5, after the authentication confidence has been determined in block 522, the method 500 advances to block 524 in which the computing device 102 determines whether the user has been authenticated based on the fused function and multi-factor sensor data. If not, the method 500 advances to block 528. In block 528, the computing device 102 may perform some type of security action. For example, in block 530, the computing device 102 may prompt the user for an active authentication (e.g., prompt the user for a password or PIN). The method 500 subsequently loops back to block 524 to check again whether the user has been authenticated using the active authentication.

If the user is determined to be authenticated in block 524 (either passively using the fusing function or actively in block 528), the method 500 advances to block 526 in which the computing device determines whether the authentication confidence is less than a threshold amount. If so, the method 500 advances to block 528 to again perform a security action, such as an active user authentication action. In this way, even though the user has been successfully authenticated, the computing device 102 may perform a security action, such as locking the user from the computing device 102, locking an application, requiring the user to actively authenticate, etc., if the authentication confidence is not greater than the threshold level. Additionally, it should be appreciated that the user may be actively authenticated at some time prior to the execution of the method 500 in some embodiments.

It should further be appreciated that the computing device 102 may actively monitor the authentication confidence and perform the security action should the authentication confidence fall below the threshold level over time. For example, should a particular sensor 120 of the computing device 102 no longer be available or otherwise used in authenticating the user, the authentication confidence score may decrease without the use of that additional sensor to a level to cause the additional security action in block 528, even though the user was successfully authenticated based on the remaining sensors. Periodical, continual, or continuous authentication is an alternative approach to the traditional active authentication that is made feasible by using passive factors—like motion, location, and vicinity. It should be appreciated that passive factors don't require user interruption to respond to a challenge. Instead, they monitor ambient indicators of the particular user's presence. Motion, vicinity of user, vicinity to other devices, location, ambient light, and ambient noise are examples of sensing that could be used for passive authentication. Of course, in other embodiments, other passive authentication factors may be used to authenticate the user.

EXAMPLES

Illustrative examples of the devices, systems, and methods disclosed herein are provided below. An embodiment of the devices, systems, and methods may include any one or more, and any combination of, the examples described below.

Example 1 includes a computing device for user authentication, the computing device comprising a plurality of authentication sensors; a sensor aggregation module to receive sensor data from the plurality of authentication sensors; and an authentication module to (i) determine a plurality of authentication factors based on the sensor data, (ii) authenticate, by use of a fused function, a user of the computing device based on the authentication factors, wherein the fused function is to generate an authentication result as a function of the plurality of authentication factors, (iii) determine a false accept rate and a false reject rate for the authentication of the user, and (iv) determine an authentication confidence for the authentication of the user based on the determined false accept rate and false reject rate.

Example 2 includes the subject matter of Example 1, and wherein to authenticate the user comprises to authenticate the user without interruption of the user.

Example 3 includes the subject matter of any of Examples 1 and 2, and wherein to determine the authentication confidence comprises to determine, without interruption of the user, the authentication confidence repeatedly over a period of time subsequent to an initial authentication of the user.

Example 4 includes the subject matter of any of Examples 1-3, and to determine the authentication confidence comprises to determine an authentication confidence based on the following equation:

$$CNF = \frac{1-FRR}{1-FRR+\frac{FAR}{P(R=u)}-FAR};$$

wherein CNF is the authentication confidence, FAR is the false accept rate, FRR is the false reject rate, and P(R=u) is a constant.

Example 5 includes the subject matter of any of Examples 1-4, and wherein to determine the authentication confidence comprises to determine the authentication confidence without interruption from the user.

Example 6 includes the subject matter of any of Examples 1-5, and wherein to determine the authentication confidence comprises to determine the authentication confidence repeatedly over a period of time subsequent to an initial authentication of the user.

Example 7 includes the subject matter of any of Examples 1-6, and wherein the constant P(R=u) is 1.

Example 8 includes the subject matter of any of Examples 1-7, and wherein the constant P(R=u) is based on a ground truth table.

Example 9 includes the subject matter of any of Examples 1-8, and wherein the authentication module is further to perform an active authentication of the user in response to the authentication confidence having a predefined relationship to a threshold value.

Example 10 includes the subject matter of any of Examples 1-9, and wherein the fused function comprises a truth table, wherein the inputs of the truth table comprise the plurality of authentication factors.

Example 11 includes the subject matter of any of Examples 1-10, and wherein the plurality of authentication sensors comprise a plurality of passive authentication sensors that generate sensor data without interruption of the user.

Example 12 includes the subject matter of any of Examples 1-11, and wherein the plurality of authentication sensors comprise a motion sensor to generate motion sensor data indicative of at least one of a motion or orientation of the computing device.

Example 13 includes the subject matter of any of Examples 1-12, and wherein the plurality of authentication sensors comprise a location sensor to generate location sensor data indicative of a location of the computing device.

Example 14 includes the subject matter of any of Examples 1-13, and wherein the plurality of authentication sensors comprise a vicinity sensor to generate vicinity sensor data indicative of a local environment of the computing device.

Example 15 includes the subject matter of any of Examples 1-14, and wherein the authentication module comprises a plurality of classifiers, and wherein to determine the plurality of authentication factors comprise to classify the sensor data with the plurality of classifiers.

Example 16 includes the subject matter of any of Examples 1-15, and wherein the plurality of classifiers comprise a first classifier that receives the output of a second classifier.

Example 17 includes the subject matter of any of Examples 1-16, and wherein to determine the false accept rate and the false reject rate for the authentication of the user comprises to update a base false accept rate and a false reject rate associated with the fusion function based on the authentication result.

Example 18 includes the subject matter of any of Examples 1-17, and wherein to determine the false accept rate comprises to determine the false accept rate based on the equation of:

$$FAR=|fp|/(|fp|+|tn|);$$

wherein FAR is the false accept rate, fp is the number of false positives, and to is the number of true negatives.

Example 19 includes the subject matter of any of Examples 1-18, and wherein to determine the false reject rate comprises to determine the false accept rate based on the following equation:

$$FRR=|fn|/(|fn|+|tp|);$$

wherein FRR is the false accept rate, fn is the number of false negatives, and tp is the number of true positives.

Example 20 includes a method for user authentication on a computing device, the method comprising receiving, by a sensor aggregation module, sensor data from a plurality of authentication sensors; determining, by an authentication module of the computing device, a plurality of authentication factors based on the sensor data; authenticating, by the authentication module and using a fused function, a user of the computing device based on the authentication factors, wherein the fused function generates an authentication result as a function of the plurality of authentication factors; determining a false accept rate and a false reject rate for the authentication of the user; and determining an authentication confidence for the authentication of the user based on the determined false accept rate and false reject rate.

Example 21 includes the subject matter of Example 20, and wherein authenticating the user comprises authenticating the user without interruption of the user.

Example 22 includes the subject matter of any of Examples 20 and 21, and wherein determining the authentication confidence comprises determining, without interruption of the user, the authentication confidence repeatedly over a period of time subsequent to an initial authentication of the user.

Example 23 includes the subject matter of any of Examples 20-22, and wherein determining the authentication confidence comprises determining an authentication confidence based on the following equation:

$$CNF = \frac{1-FRR}{1-FRR+\frac{FAR}{P(R=u)}-FAR};$$

wherein CNF is the authentication confidence, FAR is the false accept rate, FRR is the false reject rate, and P(R=u) is a constant.

Example 24 includes the subject matter of any of Examples 20-23, and wherein determining the authentication confidence comprises determining the authentication confidence without interruption from the user.

Example 25 includes the subject matter of any of Examples 20-24, and wherein determining the authentication confidence comprises determining the authentication confidence repeatedly over a period of time subsequent to an initial authentication of the user.

Example 26 includes the subject matter of any of Examples 20-25, and wherein the constant P(R=u) is 1.

Example 27 includes the subject matter of any of Examples 20-26, and wherein the constant P(R=u) is based on a ground truth table.

Example 28 includes the subject matter of any of Examples 20-27, and further comprising performing an active authentication of the user in response to the authentication confidence having a predefined relationship to a threshold value.

Example 29 includes the subject matter of any of Examples 20-28, and wherein authenticating the user of the computing device comprises authenticating the user using a fused function comprises authenticating the user using a truth table, wherein the inputs of the truth table comprise the plurality of authentication factors.

Example 30 includes the subject matter of any of Examples 20-29, and wherein receiving sensor data comprises receiving sensor data from a plurality of passive authentication sensors, wherein each of the passive authentication sensors generate sensor data without interruption of the user.

Example 31 includes the subject matter of any of Examples 20-30, and wherein receiving sensor data comprises receiving motion sensor data from a motion sensor, wherein the motion sensor data is indicative of at least one of a motion or orientation of the computing device.

Example 32 includes the subject matter of any of Examples 20-31, and wherein receiving sensor data comprises receiving location sensor data from a location sensor, wherein the location sensor data is indicative of a location of the computing device.

Example 33 includes the subject matter of any of Examples 20-32, and wherein receiving sensor data comprises receiving vicinity sensor data from a vicinity sensor, the vicinity sensor data indicative of a local environment of the computing device.

Example 34 includes the subject matter of any of Examples 20-33, and wherein determining a plurality of authentication factors comprises classifying the sensor data using a plurality of classifiers.

Example 35 includes the subject matter of any of Examples 20-34, and wherein classifying the sensor data comprises classifying the sensor data using a first classifier that receives the output of a second classifier.

Example 36 includes the subject matter of any of Examples 20-35, and wherein determining the false accept rate and the false reject rate for the authentication of the user comprises updating a base false accept rate and a false reject rate associated with the fusion function based on the authentication result.

Example 37 includes the subject matter of any of Examples 20-36, and wherein determining the false accept rate comprises determining the false accept rate based on the equation of:

$$FAR=|fp|/(|fp|+|tn|);$$

wherein FAR is the false accept rate, fp is the number of false positives, and to is the number of true negatives.

Example 38 includes the subject matter of any of Examples 20-37, and wherein determining the false reject rate comprises determining the false accept rate based on the following equation:

$$FRR=|fn|/(|fn|+|tp|);$$

wherein FRR is the false accept rate, fn is the number of false negatives, and tp is the number of true positives.

Example 39 includes one or more machine readable storage media comprising a plurality of instructions stored thereon that in response to execution cause a computing device to perform the method of any of Examples 20-38.

Example 40 includes a computing device for user authentication, the computing device comprising means for receiving sensor data from a plurality of authentication sensors; means for determining a plurality of authentication factors based on the sensor data; means for authenticating, using a fused function, a user of the computing device based on the authentication factors, wherein the fused function generates an authentication result as a function of the plurality of authentication factors; means for determining a false accept rate and a false reject rate for the authentication of the user; and means for determining an authentication confidence for the authentication of the user based on the determined false accept rate and false reject rate.

Example 41 includes the subject matter of Example 40, and wherein the means for authenticating the user comprises means for authenticating the user without interruption of the user.

Example 42 includes the subject matter of any of Examples 40 and 41, and wherein the means for determining the authentication confidence comprises means for determining, without interruption of the user, the authentication confidence repeatedly over a period of time subsequent to an initial authentication of the user.

Example 43 includes the subject matter of any of Examples 40-42, and wherein the means for determining the authentication confidence comprises means for determining an authentication confidence based on the following equation:

$$CNF = \frac{1-FRR}{1-FRR+\frac{FAR}{P(R=u)}-FAR};$$

wherein CNF is the authentication confidence, FAR is the false accept rate, FRR is the false reject rate, and P(R=u) is a constant.

Example 44 includes the subject matter of any of Examples 40-43, and wherein the means for determining the authentication confidence comprises means for determining the authentication confidence without interruption from the user.

Example 45 includes the subject matter of any of Examples 40-44, and wherein the means for determining the authentication confidence comprises means for determining the authentication confidence repeatedly over a period of time subsequent to an initial authentication of the user.

Example 46 includes the subject matter of any of Examples 40-45, and wherein the constant P(R=u) is 1.

Example 47 includes the subject matter of any of Examples 40-46, and wherein the constant P(R=u) is based on a ground truth table.

Example 48 includes the subject matter of any of Examples 40-47, and further comprising means for performing an active authentication of the user in response to the authentication confidence having a predefined relationship to a threshold value.

Example 49 includes the subject matter of any of Examples 40-48, and wherein the means for authenticating the user of the computing device comprises means for authenticating the user using a fused function comprises authenticating the user using a truth table, wherein the inputs of the truth table comprise the plurality of authentication factors.

Example 50 includes the subject matter of any of Examples 40-49, and wherein the means for receiving sensor data comprises means for receiving sensor data from a plurality of passive authentication sensors, wherein each of the passive authentication sensors generate sensor data without interruption of the user.

Example 51 includes the subject matter of any of Examples 40-50, and wherein the means for receiving sensor data comprises means for receiving motion sensor data from a motion sensor, wherein the motion sensor data is indicative of at least one of a motion or orientation of the computing device.

Example 52 includes the subject matter of any of Examples 40-51, and wherein the means for receiving sensor data comprises means for receiving location sensor data from a location sensor, wherein the location sensor data is indicative of a location of the computing device.

Example 53 includes the subject matter of any of Examples 40-52, and wherein the means for receiving sensor data comprises means for receiving vicinity sensor data from a vicinity sensor, the vicinity sensor data indicative of a local environment of the computing device.

Example 54 includes the subject matter of any of Examples 40-53, and wherein the means for determining a plurality of authentication factors comprises means for classifying the sensor data using a plurality of classifiers.

Example 55 includes the subject matter of any of Examples 40-54, and wherein the means for classifying the sensor data comprises means for classifying the sensor data using a first classifier that receives the output of a second classifier.

Example 56 includes the subject matter of any of Examples 40-55, and wherein the means for determining the false accept rate and the false reject rate for the authentication of the user comprises means for updating a base false accept rate and a false reject rate associated with the fusion function based on the authentication result.

Example 57 includes the subject matter of any of Examples 40-56, and wherein the means for determining the false accept rate comprises means for determining the false accept rate based on the equation of:

$$FAR=|fp|/(|fp|+|tn|);$$

wherein FAR is the false accept rate, fp is the number of false positives, and to is the number of true negatives.

Example 58 includes the subject matter of any of Examples 40-57, and wherein the means for determining the false reject rate comprises means for determining the false accept rate based on the following equation:

$$FRR=|fn|/(|fn|+|tp|);$$

wherein FRR is the false accept rate, fn is the number of false negatives, and tp is the number of true positives.

The invention claimed is:

1. A computing device for user authentication, the computing device comprising:
   a plurality of authentication sensors;

a sensor aggregation module to receive sensor data from the plurality of authentication sensors; and an authentication module to (i) determine a plurality of authentication factors based on the sensor data, (ii) authenticate, by use of a fused function, a user of the computing device based on the authentication factors, wherein the fused function is to generate an authentication result as a function of the plurality of authentication factors, (iii) determine a false accept rate and a false reject rate for the authentication of the user, and (iv) determine an authentication confidence for the authentication of the user based on the determined false accept rate and false reject rate, wherein to determine the authentication confidence comprises to determine an authentication confidence based on the following equation:

$$CNF = \frac{1 - FRR}{1 - FRR + \frac{FAR}{P(R=u)} - FAR};$$

wherein CNF is the authentication confidence, FAR is the false accept rate, FRR is the false reject rate, and P(R=u) is a constant.

2. The computing device of claim 1, wherein to authenticate the user comprises to authenticate the user without interruption of the user.

3. The computing device of claim 2, wherein to determine the authentication confidence comprises to determine, without interruption of the user, the authentication confidence repeatedly over a period of time subsequent to an initial authentication of the user.

4. The computing device of claim 1, wherein the authentication module is further to perform an active authentication of the user in response to the authentication confidence having a predefined relationship to a threshold value.

5. The computing device of claim 1, wherein the fused function comprises a truth table, wherein the inputs of the truth table comprise the plurality of authentication factors.

6. The computing device of claim 1, wherein the plurality of authentication sensors comprise a plurality of passive authentication sensors that generate sensor data without interruption of the user.

7. The computing device of claim 1, wherein the plurality of authentication sensors comprise at least one of: a motion sensor to generate motion sensor data indicative of at least one of a motion or orientation of the computing device, a location sensor to generate location sensor data indicative of a location of the computing device, or a vicinity sensor to generate vicinity sensor data indicative of a local environment of the computing device.

8. The computing device of claim 1, wherein to determine the false accept rate and the false reject rate for the authentication of the user comprises to update a base false accept rate and a false reject rate associated with the fusion function based on the authentication result.

9. One or more non-transitory, machine readable storage media comprising a plurality of instructions stored thereon that, in response to execution, cause a computing device to
receive sensor data from a plurality of authentication sensors;
determine a plurality of authentication factors based on the sensor data;
authenticate, by a fused function, a user of the computing device based on the authentication factors, wherein the fused function generates an authentication result as a function of the plurality of authentication factors;
determine a false accept rate and a false reject rate for the authentication of the user; and
determine an authentication confidence for the authentication of the user based on the determined false accept rate and false reject rate, wherein to determine the authentication confidence comprises to determine an authentication confidence based on the following equation:

$$CNF = \frac{1 - FRR}{1 - FRR + \frac{FAR}{P(R=u)} - FAR};$$

wherein CNF is the authentication confidence, FAR is the false accept rate, FRR is the false reject rate, and P(R=u) is a constant.

10. The one or more non-transitory, machine readable storage media of claim 9, wherein to authenticate the user comprises to authenticate the user without interruption of the user.

11. The one or more non-transitory, machine readable storage media of claim 10, wherein to determine the authentication confidence comprises to determine, without interruption of the user, the authentication confidence repeatedly over a period of time subsequent to an initial authentication of the user.

12. The one or more non-transitory, machine readable storage media of claim 9, wherein the plurality of instructions further cause the computing device to perform an active authentication of the user in response to the authentication confidence having a predefined relationship to a threshold value.

13. The one or more non-transitory, machine readable storage media of claim 9, wherein to authenticate the user of the computing device comprises to authenticate the user by a truth table, wherein the inputs of the truth table comprise the plurality of authentication factors.

14. The one or more non-transitory, machine readable storage media of claim 9, wherein to receive sensor data comprises to receive sensor data from a plurality of passive authentication sensors, wherein each of the passive authentication sensors generate sensor data without interruption of the user.

15. The one or more non-transitory, machine readable storage media of claim 9, wherein to determine the false accept rate and the false reject rate for the authentication of the user comprises to update a base false accept rate and a false reject rate associated with the fusion function based on the authentication result.

16. A method for user authentication on a computing device, the method comprising:
receiving, by a sensor aggregation module, sensor data from a plurality of authentication sensors;
determining, by an authentication module of the computing device, a plurality of authentication factors based on the sensor data;
authenticating, by the authentication module and using a fused function, a user of the computing device based on the authentication factors, wherein the fused function generates an authentication result as a function of the plurality of authentication factors;
determining a false accept rate and a false reject rate for the authentication of the user; and determining an authentication confidence for the authentication of the user based on the determined false accept rate and false reject rate, wherein determining the authentication confidence comprises determining an authentication confidence based on the following equation:

$$CNF = \frac{1-FRR}{1-FRR+\frac{FAR}{P(R=u)}-FAR};$$

wherein CNF is the authentication confidence, FAR is the false accept rate, FRR is the false reject rate, and P(R=u) is a constant.

17. The method of claim 16, wherein authenticating the user comprises authenticating the user without interruption of the user.

18. The method of claim 17, wherein determining the authentication confidence comprises determining, without interruption of the user, the authentication confidence repeatedly over a period of time subsequent to an initial authentication of the user.

19. The method of claim 16, further comprising performing an active authentication of the user in response to the authentication confidence having a predefined relationship to a threshold value.

20. The method of claim 16, wherein authenticating the user of the computing device comprises authenticating the user using a fused function comprises authenticating the user using a truth table, wherein the inputs of the truth table comprise the plurality of authentication factors.

21. The method of claim 16, wherein receiving sensor data comprises receiving sensor data from a plurality of passive authentication sensors, wherein each of the passive authentication sensors generate sensor data without interruption of the user.

22. The method of claim 16, wherein determining the false accept rate and the false reject rate for the authentication of the user comprises updating a base false accept rate and a false reject rate associated with the fusion function based on the authentication result.

\* \* \* \* \*